July 28, 1964
J. O. MELTON ETAL
3,142,186
CAM OPERATED PULSING DEVICE
Filed May 22, 1961
5 Sheets-Sheet 1
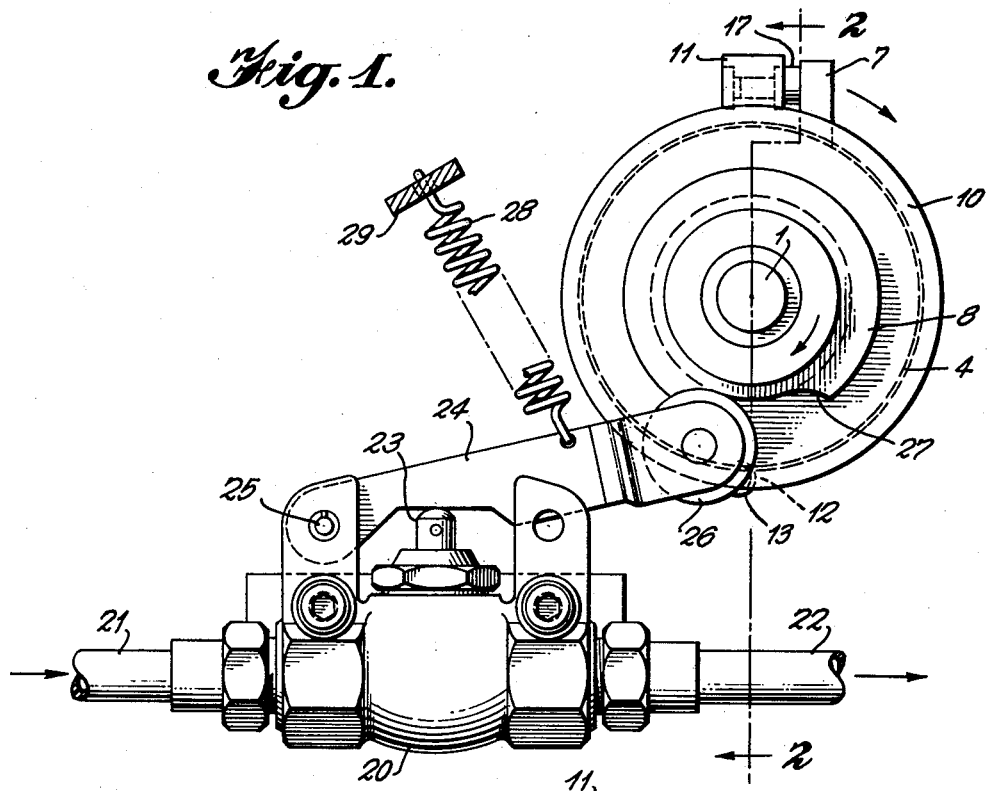
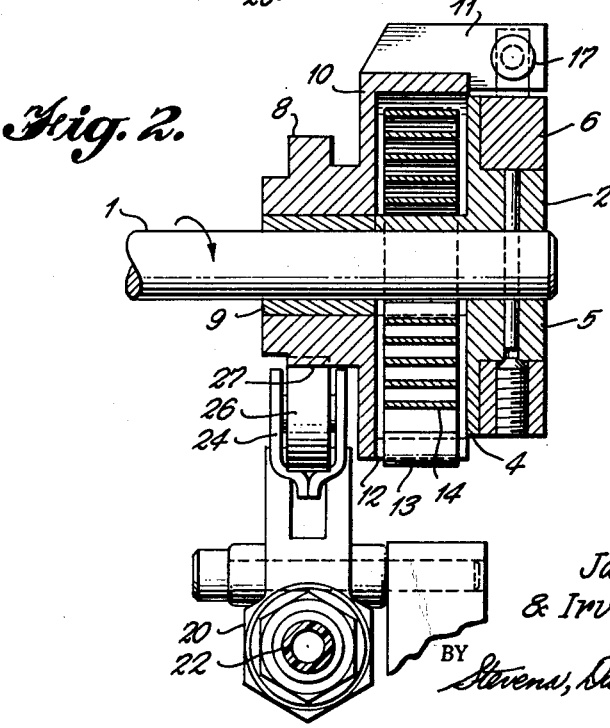
INVENTORS
James O. Melton
& Irvin M. Carpenter
BY Stevens, Davis, Miller & Mosher
ATTORNEYS

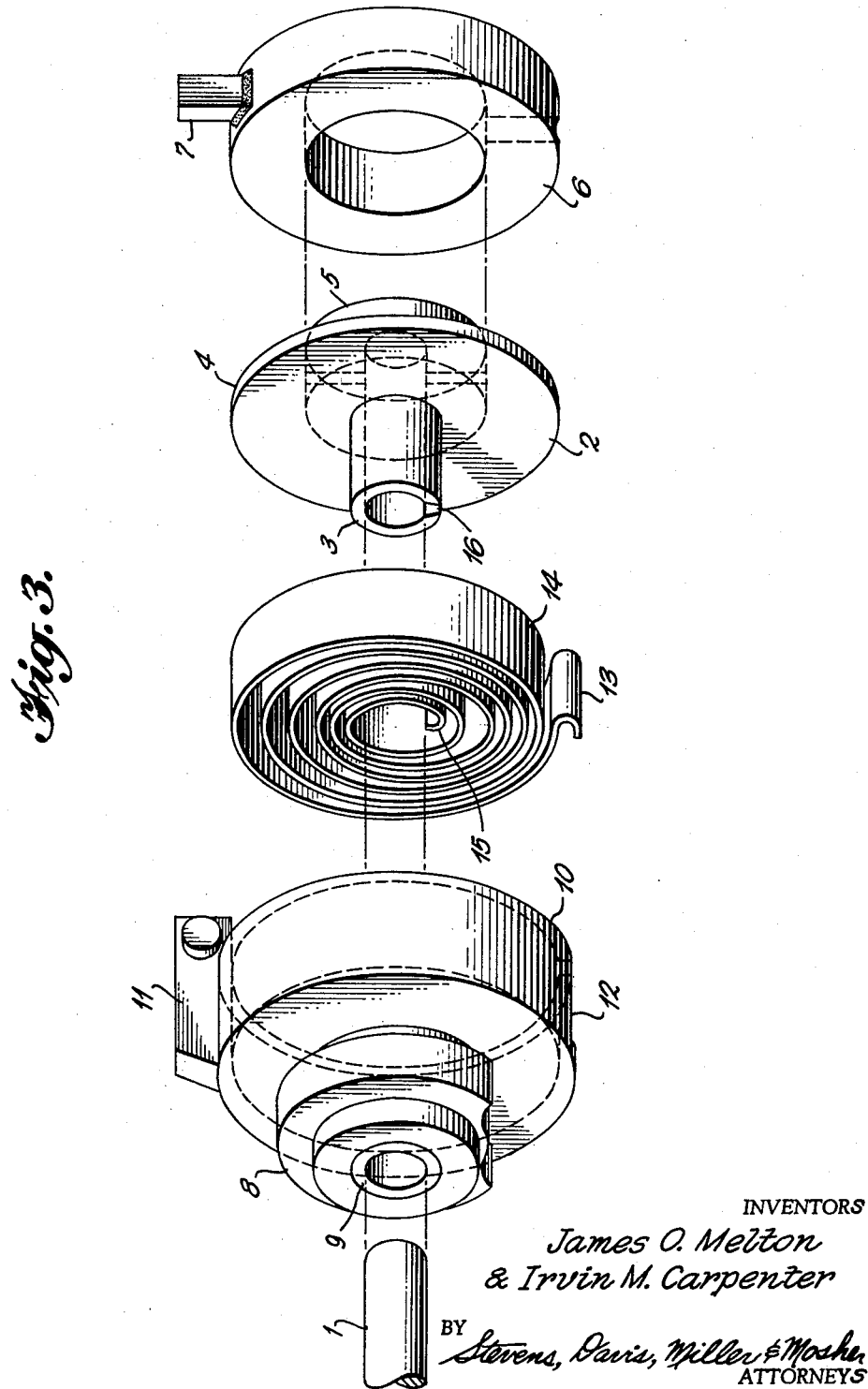

July 28, 1964  J. O. MELTON ETAL  3,142,186
CAM OPERATED PULSING DEVICE
Filed May 22, 1961  5 Sheets-Sheet 3

INVENTORS
James O. Melton
& Irvin M. Carpenter
BY
Stevens, Davis, Miller & Mosher
ATTORNEYS INVENTORS
James O. Melton
& Irvin M. Carpenter July 28, 1964 J. O. MELTON ETAL 3,142,186
CAM OPERATED PULSING DEVICE
Filed May 22, 1961 5 Sheets-Sheet 5

INVENTORS
James O. Melton
& Irvin M. Carpenter

BY Stevens, Davis, Miller & Mosher
ATTORNEYS

3,142,186
CAM OPERATED PULSING DEVICE
James O. Melton, Norman, and Irvin M. Carpenter, Oklahoma City, Okla., assignors to The Geolograph Company, Oklahoma City, Okla., a corporation of Oklahoma
Filed May 22, 1961, Ser. No. 111,778
5 Claims. (Cl. 74—54)

The present invention relates to a cam operated pulsing device which is actuated in response to the movement of an element or system, wherein it is desired to measure or record such movement or to actuate another device (or devices) in response to such movement. The cam operated device preferably will produce a pneumatic pulse for the purpose of indicating, recording or energizing another device as described above. The device of the present invention has particular utility in combination with recording equipment for well drilling apparatus.

The basic device of the present invention involves four essential components. The first component comprises a cam which is rotated intermittently. The second component is a switch or valve having an operating member bearing resiliently against the cam. The third component is a member which is continuously driven in response to the movement which is to be measured or recorded, etc. The fourth component is a clock spring whose ends engage portions of the first and third components, respectively.

The arrangement between the first, third and fourth components is such that, as the third component rotates continuously, the clock spring is wound up so as to increase the tension in the spring. The cam, however, is not moved prior to one complete revolution of the continuously rotating member because the pressure of the operating member (of the valve) bearing against the cam will prevent such movement. As the third component completes a single revolution, a projecting member thereon will contact a corresponding projecting member on the first component moving the cam against the action of the resiliently urged operating member such that the cam is then free to rotate. The tension in the clock spring will cause the cam to turn quickly through a single revolution until the operating member of the valve reengages the cam at its initial position.

During the rotation of the cam, the movement of the operating member of the valve will cause the valve to be energized for the period of rotation of the cam. Thus, a pneumatic pulse will be produced for each complete revolution of the continuously moving member. On the other hand, it should be apparent that the operation of the cam and, hence, the valve is intermittent. The time required for a single revolution of the cam will depend primarily upon the pretensioning of the clock spring. It is also necessary to provide a certain amount of resilient force of the operating member of the valve against the cam so as to prevent rotation of the latter prior to the time that the projecting member of the third component contacts the corresponding projecting portion of the first component.

As suggested above, the valve which is operated by the cam, can be used to operate a recording device or to energize another device wherein it is desired to produce motion consistent with that measured by the present invention.

In general, recording apparatus which have been used in connection with the drilling of oil wells have been of two basic types. As will appear hereinafter, it is possible to employ the device of the present invention in association with both of these two types. In the first type of recorder, a suitable chart is moved continuously at a constant rate of speed; a pen bearing against the chart is deflected intermittently each time that a foot (or given number of feet) is drilled. Thus, the time function is represented along the ordinate and the indications of feet drilled appear as movements in the direction of the abscissa. In the first type of recording device, the time required for the drilling of a single foot can be determined by measuring the time distance along the ordinate between two successive deflections; similarly, a more general indication of the rate at which the drilling operation is progressing can be determined by the relative spacing between successive deflections in a given series.

The second basic type of recorder is one wherein the chart is moved intermittently in response to the drilling of a single foot or of a given number of feet. The pen is moved continuously across the chart at a constant rate of speed until the given increment of drilling distance is completed. At this point, the pen is returned to its initial reference position, while, at the same time, the chart is advanced one step. In this type of chart, the drilling distance appears along the ordinate and the time is represented along the abscissa. The time required for the drilling of a single foot can be read quite accurately from the chart of this second type of recorder. The progress of the drilling operation can be determined by comparing the lengths of the traces representing successive feet or a series of feet. One advantage of the second type of recorder is that the depth scale can be made the same as that used in electrical and gamma ray logs. This is especially valuable to the geologist who can thus make a direct comparison with electrical or gamma ray logs on other wells, and who may thus make many important and prompt decisions while the well is being drilled.

The first type of recorder, such as is shown in Patents Numbers 2,833,256 and 2,980,486, is actuated by a pulley wheel which is moved in direct response to the movement of the drill string.

The second type of recorder, which is shown in Patent No. 2,981,102, may also be driven by such a pulley wheel.

In some circumstances where it has been proposed to provide both types of recorders, the first recorder is driven by the pulley wheel in the same manner as before, but the second recorder is driven by the first recorder.

The device of the present invention has particular application in conjunction with the first type of recorder where an additional pen is provided therein to be deflected intermittently in response to the movement of a condition to be measured. For example, if it is desired to provide a deflection for every 800 revolutions of the drilling table, then this additional pen can be deflected by the device of the present invention such that the space between each two successive deflections will represent the time required for 800 revolutions of the drilling table. From this information, it can be determined how many revolutions of the drilling table are required to drill a single foot, or a given foot.

On the other hand, the device of the present invention may be operatively connected to the first recording device, and by appropriate gearing, to the main shaft thereof which is driven by the pulley wheel, in such a manner as to provide a pneumatic pulse which will operate a recorder of the second type. Under this last-mentioned arrangement, the second type of recorder may be located in a position remote from the first recorder.

Therefore, it is the principal object of the present invention to provide a pulsing device of the type referred to above which is capable of providing a pulse for a given predetermined movement of an element or system whose movement is to be measured.

Another object of the present invention is to provide a device of the type referred to above which is capable of operating a recording element.

Another object of the present invention is to provide a device as referred to above which is capable of operating a recording apparatus of the second type referred to above in response to the movement of the recording apparatus of the first type referred to above.

Other and further objects and advantageous features of the present invention will hereinafter more fully appear in connection with a detailed description of the drawings in which:

FIGURE 1 is an elevation of the device of the present invention showing, in particular, details of the cam and the operating element for the valve;

FIGURE 2 is a sectional view taken along section line 2—2 of FIGURE 1 showing details of the internal structure of the present invention;

FIGURE 3 is an exploded view in perspective of the structure shown in FIGURE 1 except for the valve and its operating element;

Figure 4:
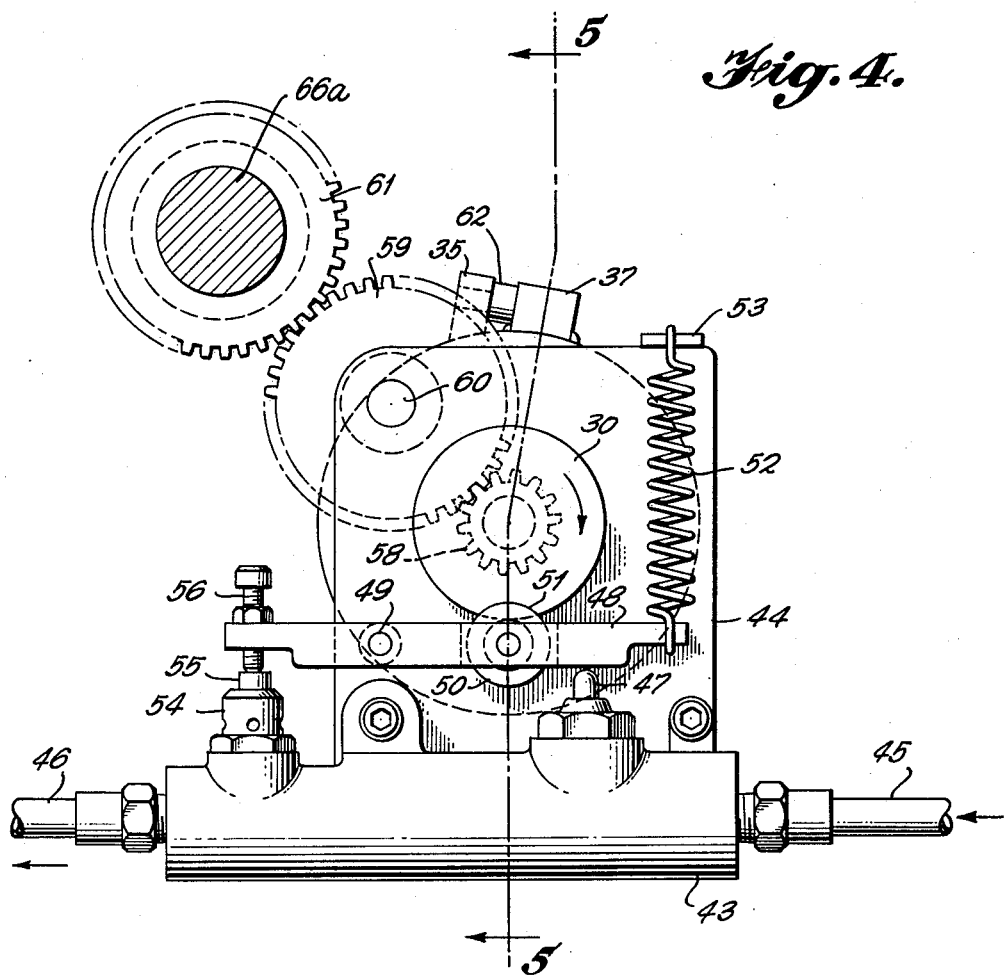
FIGURE 4 is an elevation of a second embodiment of the present invention.

Referring to the drawings in detail, FIGURES 1 to 3 show an embodiment of the present invention wherein an input shaft 1 is connected by any convenient means (not shown) to an element or to a portion of a system whose movement is to be measured. If the element in question has a rotary motion, connection to shaft 1 may be made simply by providing suitable gears. If the element involves a reciprocating movement, such as pump stroke, then, in addition to the gears, suitable means well-known in the art will be provided to translate the reciprocatory motion into rotary motion. In any event, the input shaft 1 is conected so as to rotate in the direction of the arrows in FIGURES 1 and 2 in response to the movement of the element whose behavior is to be indicated or recorded.

The right-hand end of the shaft 1, as it appears in FIGURE 2, is keyed to a sleeve 2 having a slotted cylindrical portion 3, a central circumferential flange 4, and a cylindrical boss 5. A collar 6 is mounted on the boss 5 and keyed thereto. The collar 6 is provided with an outwardly projecting extension 7, the purpose for which will appear hereinafter. In view of the above, it should appear that the sleeve 2 and the collar 6 will rotate as a unit with the shaft 1.

A cam 8 is freely rotatably mounted on the shaft 1 by means of the bronze bushing 9. The cam 8 is integral with a spring housing 10, the latter being provided at its periphery with a longitudinally projecting extension 11, the purpose of which will appear hereinafter. The spring housing 10 is provided with a slot 12 in which is received the outer end 13 of a clock spring 14. The inner end 15 of the clock spring is received in the slot 16 of the slotted cylinder 3. A nylon button 17 is mounted on the extension 11 so as to engage the extension 7, as it appears in FIGURE 1.

A pneumatic valve 20 is mounted in a position below and adjacent to the shaft 1. The valve 20 is provided with an inlet line 21 and an outlet line 22. A plunger 23 is connected to internal components of the valve (not shown) so as to connect the inlet 21 with the outlet 22 when the plunger is depressed. If desired, additional means can be provided (within the valve or in addition thereto) to permit a bleed-off of pressure from the outlet line 22 when the plunger 23 is in the position shown in FIGURE 1. An operating lever 24, pivotally mounted on the valve at 25, is provided with a roller 26 at its outer end. In the position shown in FIGURE 1, the roller 26 is received within the depression 27 of the cam 8. A helical spring 28, connected at one end to the arm 24 and at its other end to a fixed support 29, serves to urge the roller 26 resiliently into the depression 27.

*Operation Re FIGURES 1 to 3*

It will be assumed that the shaft 1 is connected to an element whose degree of movement is to be measured; it will be assumed further, that the shaft 1 is rotating continuously. In like fashion, the sleeve 2 and collar 6 will be rotating continuously with the shaft 1. As these members rotate, the slotted cylinder 3 engages the inner end 15 of the clock spring 14 so as to wind up the spring or, in other words, to increase the internal tension therein. The clock spring 14 does not itself move because the outer end 13 is received within the slot 12 of the spring housing 10. The spring housing 10 is held against rotational movement by virtue of the fact that the roller 26 is urged into the depression 27 of the cam 8 under the action of the spring 28. Thus, the force of the spring 28 is sufficient to prevent rotation of the spring housing 10 while the clock spring 14 is being wound up.

As the collar 6 moves in a clockwise direction (referring to FIGURE 1), the extension 7 moves away from the extension 11 in a circular direction such that the extension 7 approaches the extension 11 from the opposite side. When, after almost a complete revolution of the collar 6, extension 7 contacts the extension 11, the force exerted on the spring housing 10 is sufficient to overcome the retention force of the roller 26 such that the roller is moved out of the depression, thereafter resting on the smooth cylindrical portion of the cam. At this point, there is substantially no resistance to movement of the spring housing 10 and, therefore, the latter moves rapidly in a clockwise direction under the action of the clock spring 14 until the extension 7 strikes against the extension 11. Actually, the nylon button 17 absorbs the shock of this impact. During the time that the roller 26 is riding on the smooth portion of the cam 8, the arm 24 will be moved downwardly and, hence, the plunger 23 will be depressed; under the latter conditions, the presure from the inlet line 21 will be transmitted to the outlet line 22 through the valve 20.

Figure 5:
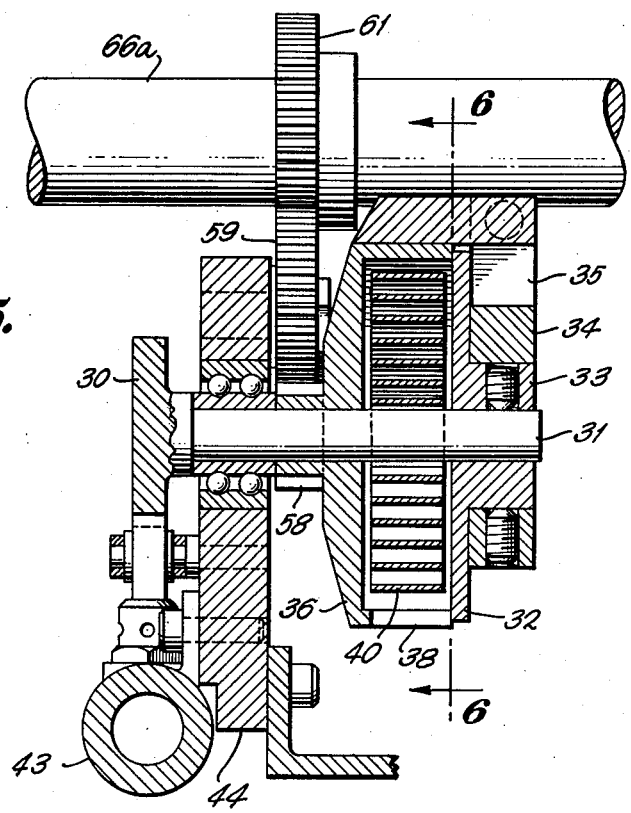
FIGURE 5 is a sectional view taken along section line 5—5 of FIGURE 4.
Figure 6:
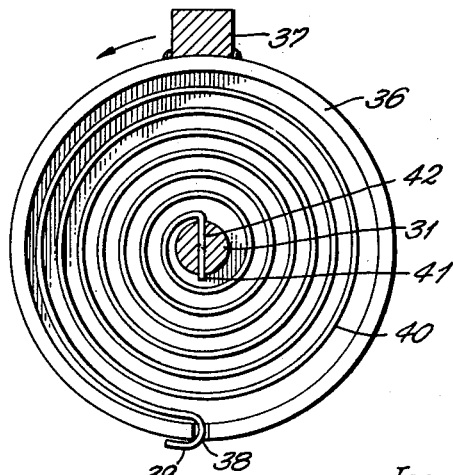
FIGURE 6 is a sectional view taken along section line 6—6 of FIGURE 5.

FIGURES 4, 5 and 6 represent a modification of the structure shown in FIGURE 1. In these figures, a cam 30 is keyed to the end of the shaft 31. A disc shaped spring retainer 32 having an enlarged boss 33 is keyed to the other end of shaft 31. A collar 34 having a radial projection 35 is, in turn, keyed to the boss 33. Intermediate the ends of the shaft 31, a spring housing 36 is freely rotatably mounted. The spring housing is provided with a longitudinally extending projection 37 which is adapted to engage the projection 35 on the collar 34. The spring housing 36 is provided with a slot 38 in which is received the end 39 of a clock spring 40. The other end 41 of the clock spring is received in a suitable slot 42 in the shaft 31.

A pneumatic valve 43 is suitably mounted on a support 44 in which the shaft 31 is journaled. An inlet conduit 45 and an outlet conduit 46 connect with opposite ends of the valve 43. A plunger 47 is provided such that, when the same is depressed, the pressure from the inlet conduit 45 may be transmitted through the valve 43 to the outlet conduit 46. An operating arm 48 is mounted above the valve 43 and is pivotally connected to the support 44 by means of the pivot pin 49. A roller 50 is mounted on the arm 48 in such a manner as to engage a depression 51 in the cam 30. A helical spring 52 engages the outer end of the arm 48 and a projecting tab 53 on the support 44 so as to urge the roller 50 resiliently into the recess 51. The valve 43 is provided with a bleed-off valve 54 having a plunger 55. The left-hand end of the arm 48 is provided with a threaded bolt 56 which, in the position shown in FIGURE 4, is adapted to engage and depress the plunger 55 so as to open the bleed-off valve 54 and vent the outlet conduit 46 to the atmosphere.

The outer casing of the spring housing 36 is provided with an external gear portion 58 which meshes with idler gear 59 mounted on a stub shaft 60. Gear 59, in turn meshes, with a gear 61 mounted on a shaft 66a. The shaft 66a can be connected, for example, to the rotary drilling table, to the mud pump, or to a recorder of the type shown in Patent No. 2,980,486. In the event it is desired to connect the structure shown in FIGURES 4 to 6 inclusive with a recorder of the last-mentioned type, the shaft 66a may be the one bearing the same reference character as in the patent aforementioned. A nylon button 62 is attached to the projecting portion 35 of the collar 34 so as to absorb the force of the impact.

*Operation Re FIGURES 4 to 6*

It will be assumed that the shaft 66a is properly connected so that it is rotating substantially continuously. The spring housing 36, therefore, would also be rotating continuously as a result of the gearing 58, 59 and 61. From the position shown in FIGURE 4, the spring housing 36 will move in a clockwise direction such that the projection 37 will move away from the projection 35 on the first half of each rotary cycle and will approach the projection 35 on the second half of each rotary cycle. During its rotary movement, the spring housing 36 will be winding up the spring 40 so as to increase the tension therein. The inner end of the spring 40 will be held against rotational movement by virtue of the fact that the cam 30, which is keyed to the shaft 31 is held against rotational movement by means of the roller 50, the latter being resiliently urged into the depression 51 in the cam 30. However, as the spring housing 36 approaches the completion of a revolution, the projection 37 will contact the projection 35 from the opposite side so as to move the cam 30 in a clockwise direction until the roller 50 is moved out of the depression 51.

As soon as the roller 50 engages the smooth portion of the cam 30, there will be essentially no resistance to the rotational movement of the cam 30 and, thus, the collar 34 and the cam 30 will be rotated immediately under the action of the spring 40. At the end of the revolution of the collar 34, the projection 35 will strike the projection 37 although the force of this impact will be absorbed by the nylon button 62. At the same time, the roller 50 will be reengaged in the depression 51. During the period of travel of the roller 50 on the smooth portion of the cam 30, the arm 48 will be depressed downwardly at its right-hand end such that the plunger 47 will be pushed downwardly opening the valve 43, so that the pressure from the inlet conduit 45 is transmitted to the outlet conduit 46. When the arm and roller return to the position shown in FIGURE 5, the screw 56 will contact the plunger 55 of the bleed-off valve 54 so as to vent the pressure in the outlet conduit 46 to the atmosphere.

Figure 7:
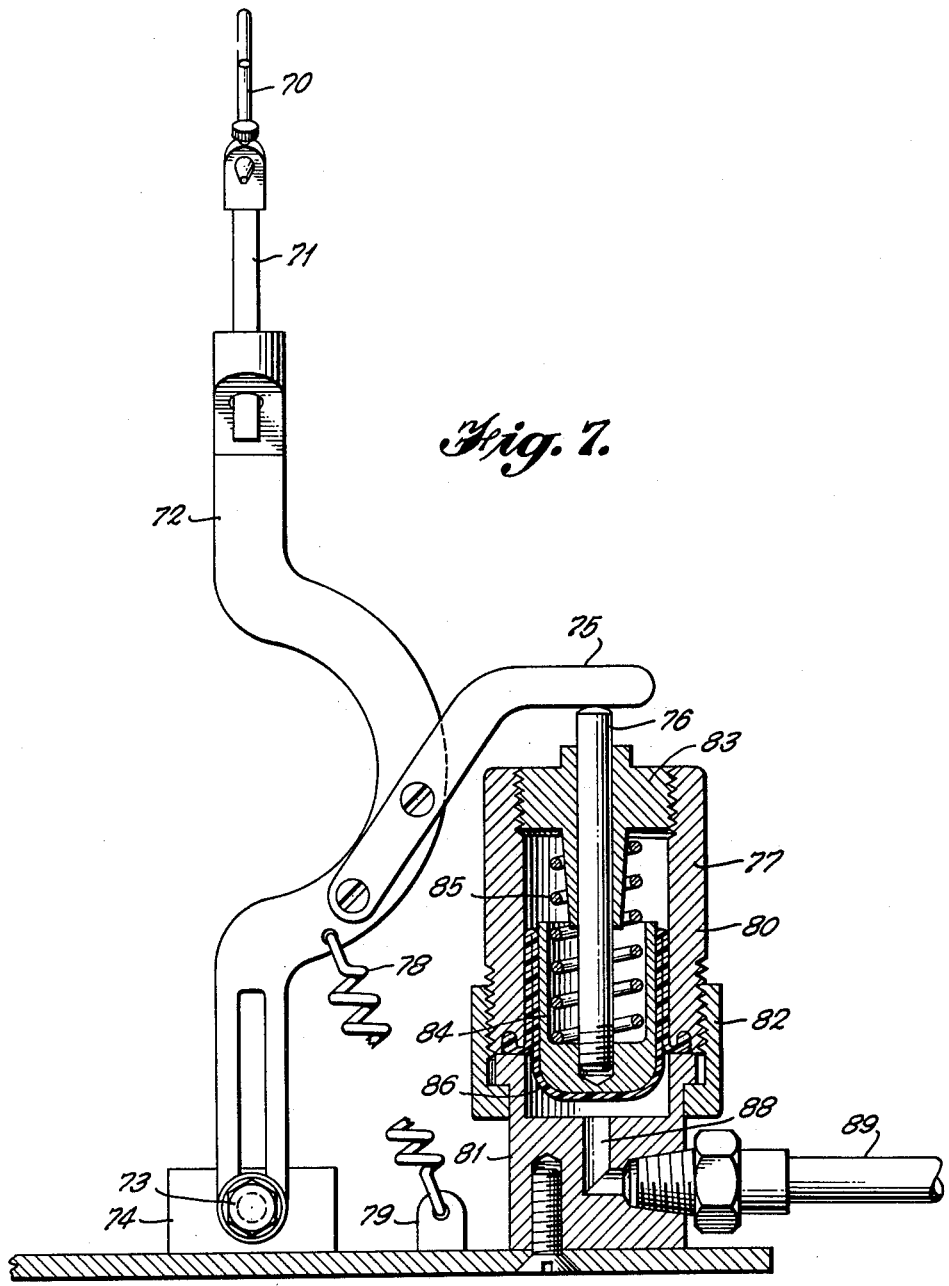
FIGURE 7 is an elevation, partly in section, of a pen and operating means to be used in conjunction with the device of the present invention.

Referring now to FIGURE 7, there is shown a recording pen and an operating means therefor which could readily be attached to a recorder of the type shown in Patent No. 2,980,486. A pen 70 is mounted in a pen holder 71, the latter being attached to the outer end of a stylus arm 72. The lower end of the stylus arm 72 is pivotally attached as at 73 to a fixed support 74. The stylus arm 72 is provided also with a projecting arm 75, the latter bearing against a plunger 76 of a pneumatic unit 77, later to be described. A spring 78, attached at one end to the stylus arm 72 and at its other end to a fixed support 79, urges the stylus arm 72 continuously in a clockwise direction such that the projecting arm 75 bears against the plunger 76.

The pneumatic unit 77 includes a main cylindrical barrel 80 which is coupled to a base member 81 by means of a threaded coupling member 82. A plug 83 is threadedly received in the upper end of the bore of the cylindrical barrel 80. The plug 83 is provided with a central hole of suitable size to permit sliding movement therethrough of the plunger 76. A piston 84 is mounted at the lower end of the plunger 76. A spring 85 surrounds the plunger 76, bearing at its upper end against the lower end of the plug 83 and at its lower end against the piston 84, so as to urge the piston and plunger downwardly. A cup-shaped flexible membrane 86 is mounted within the pneumatic unit 87 such that the end edges of the membrane are secured between the cylindrical barrel 80 and the base member 81. The membrane surrounds the piston 84 in such a manner that, when the pressure below the membrane is increased, the piston 84 and the plunger 76 will be urged upwardly. A right-angled passageway 88, passing through the base member 81, connects with an inlet conduit 89 which, in turn, could be connected to the outlet conduit 22 of the device shown in FIGURES 1 to 3 inclusive.

The pen shown in FIGURE 7 will be mounted adjacent a chart drum upon which a chart will be mounted. Preferably, the chart will be moving in a vertical direction relative to the pen as is the case in connection with Patent No. 2,980,486. Thus, the pen will normally be describing a vertical trace on the chart; when a pulse from a device such as is shown in FIGURES 1 to 3 of the present application, passes into pneumatic unit 77 through the conduit 89, the plunger 76 will be lifted briefly and the pen 70 will be deflected intermittently towards the left, referring to FIGURE 7. Thus, the trace will appear on the chart as a vertical line with a series of horizontal deflections relative thereto. The vertical spacing between successive deflections will represent the time elapsed for a predetermined number of events to occur.

Thus, if the device shown in FIGURES 1 to 3 is designed or adjusted to produce a pneumatic pulse for each 600 revolutions of the drilling table, then the pen shown in FIGURE 7 will be deflected for each 600 revolutions of the drilling table. The time interval between successive deflections produced by the pen shown in FIGURE 7 will represent the time required for 600 revolutions of the drilling table. Likewise, it is possible to connect up the unit shown in FIGURES 1 to 3 so as to reflect a predetermined number of strokes of the mud pump such that the pen shown in FIGURE 7 will be deflected accordingly. If desired, two or more of the pens of the type shown in FIGURE 7 can be incorporated into a single recording device so as to provide information relative to a plurality of different movements. Under such an arrangement, it would be necessary, of course, to have a plurality of devices similar to those shown in FIGURES 1 to 3 variously connected to the elements or prime movers whose movement is to be measured.

The second type of recorder referred to herein, as shown in Patent No. 2,981,102, has a chart which is moved stepwise after the completion of each foot drilled; also, the pen which is moved at a constant rate across the chart is returned to its initial position at the same time. Therefore, if this second type of recorder were provided with a pneumatic means for indexing the chart and the stylus, and if a device of the type shown in FIGURES 4 to 6, inclusive, were made to operate off the shaft 66a of the recorder shown in Patent No. 2,980,486, the output pulse from this device could be made to actuate the pneumatic indexing means and then the recorder of this second type could be operated by the recorder of the first type.

Other and further modifications apart from those shown or suggested herein may be made within the spirit and scope of this invention.

What is claimed is:

1. An intermittent pulsing device comprising a first rotatable member, a second rotatable member mounted for rotation substantially coaxial with said first rotatable member, an eccentric means mounted on said first rotatable member, actuator means engageable with said eccentric means, means resiliently urging said actuator means into engagement with said eccentric means to prevent rotation of said first rotatable member, a spring biasing means mounted between said first and second rotatable members, means for rotating said second rotatable member relative to said first rotatable member so as to increase the tension in said spring biasing means, a first projecting portion on said second rotatable member, and a second projecting portion on said first rotatable member adapted to be intercepted by the projecting portion on said second rotatable member, said second rotatable member under continuous rotation causing said first projecting portion to contact said second projecting portion so as to move said first rotatable member and its eccentric means relative to the resiliently urged actuator means thereby causing said second rotatable member to pass through a complete revolution under the action of said spring biasing means.

2. An intermittent pulsing device comprising a first rotatable member, a second rotatable member mounted for rotation substantially coaxial with said first rotatable member, an eccentric means mounted on said first rotatable member, actuator means engageable with said eccentric means, means resiliently urging said actuator means into engagement with said eccentric means to prevent rotation of said first rotatable member, a spiral spring means having its ends connected to said first and second rotatable members, means for rotating said second rotatable member relative to said first rotatatable member so as to increase the tension in said spiral spring means, a first projecting portion on said second rotatable member, and a second projecting portion on said first rotatable member adapted to be intercepted by the projecting portion on said second rotatable member, said second rotatable member under continuous rotation causing said first projecting portion to contact said second projecting portion so as to move said first rotatable member and its eccentric means relatively to the resilient urged actuator means thereby causing said second rotatable member to pass through a complete revolution under the action of said spiral spring means.

3. A pneumatic pulsing device comprising a first rotatable member, a second rotatable member mounted for rotation substantially coaxially with the said first rotatable member, an eccentric means mounted on said first rotatable member, said eccentric means having a relatively smooth peripheral surface with a recess therein, a valve mounted adjacent said rotatable members, said valve having an inlet conduit and an outlet conduit and a plunger connected to internal components of said valve for placing the inlet conduit in communication with the outlet conduit, an operating arm pivotally attached at one end to said valve and adapted to bear against said plunger, the other end of said operating arm having mounted thereon a roller, said roller being received in said recess of said cam, means resiliently urging said roller into said recess, a spiral spring having its ends connected to said first and second rotatable members, means for rotating said second rotatable member relative to said first rotatable member so as to increase the tension in said spiral spring, a first projecting portion on said second rotatable member, and a second projecting portion on said first rotatable member adapted to be intercepted by the projecting portion on said second rotatable member, said second rotatable member, under continuous rotation, causing said first projecting portion to contact said second projecting portion so as to move said first rotatable member against the action of said resiliently urging means thereby causing said second rotatable member to pass through a complete revolution under the action of said spiral spring, said cam, during the rotation of said second rotatable member, bearing against said roller and causing said valve to pass a pneumatic pulse from the inlet conduit to the outlet conduit.

4. An intermittent pulsing device comprising a shaft connected to an element whose degree of movement is to be measured, a driven member keyed to one end of said shaft so as to rotate continuously therewith, a spring housing freely rotatably mounted on said shaft, a cam attached to said spring housing, said cam being substantially coaxial with said shaft and having a relatively smooth surface with a recess therein, an actuator means resiliently bearing into said recess for preventing rotation of said cam and said spring housing, a spiral spring received within said spring housing, the outer end of said spiral spring being received within a slot in said spring housing, the inner end of said spiral spring being received within a slot in said driven member, said driven member having an extension, said spring housing also having an extension, the extension on said driven member moving in a continuous circular arc relative to the extension on said spring housing, said extension on said driven member contacting the extension on said spring housing once every revolution of said driven member, said spring housing, when the extension thereon is contacted by the extension of said driven member moving so as to rotate said cam relative to said actuator means thereby moving said actuator means out of the recess and onto the smooth portion of the cam, said spring housing thereafter moving immediately and rapidly through a single revolution.

5. An intermittent pulsing device comprising a shaft having a cam keyed to one end thereof, said cam having a relatively smooth surface with a recess therein, an actuator means received in said recess, means resiliently urging said actuator means into said recess, a spring housing freely rotatably received on said shaft, a collar keyed to said shaft adjacent said spring housing, said collar having thereon an extension, an extension on said spring housing adapted to be intercepted by the extension on said collar once every revolution of said collar, a spiral spring received within said spring housing, the outer end of said spiral spring being received within a slot in said spring housing, the inner end of said spiral spring being received within a slot in said shaft, an external gear portion connected to said spring housing in substantially coaxial relation with said shaft, and a gear engaging the gear portion on said spring housing for rotating said spring housing continuously in response to the movement of an element whose movement is to be measured.

References Cited in the file of this patent

UNITED STATES PATENTS

| | | |
|---|---|---|
| 715,975 | Carichoff | Dec. 16, 1902 |
| 1,766,165 | Beebe | June 24, 1930 |
| 1,830,734 | Cornelius | Nov. 31, 1931 |
| 1,891,101 | Le Count | Dec. 13, 1932 |
| 1,933,713 | Cummings | Nov. 7, 1933 |
| 2,106,042 | Stark | Jan. 18, 1938 |
| 2,177,537 | Sloan | Oct. 24, 1939 |
| 2,943,706 | Morgan | July 5, 1960 |